April 3, 1962 — R. C. ZIMMERMAN — 3,027,640
CUTTING TOOL
Filed Jan. 31, 1957 — 2 Sheets-Sheet 1
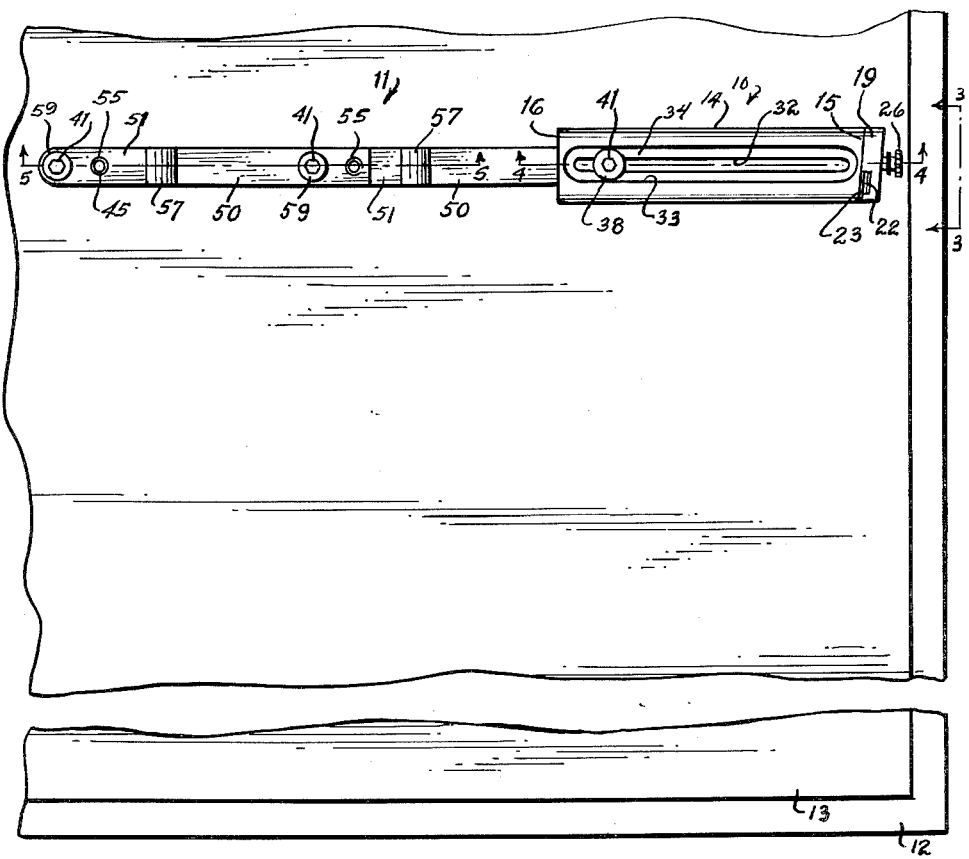
Fig.1.
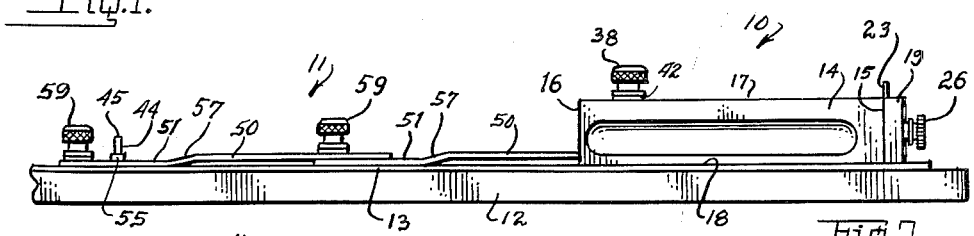
Fig.2.
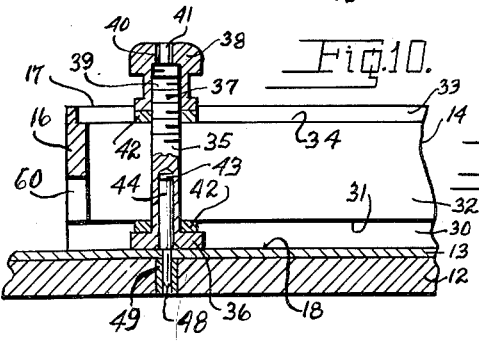
INVENTOR.
RALPH C. ZIMMERMAN
BY Joseph A. Rave
Attorney April 3, 1962 R. C. ZIMMERMAN 3,027,640
CUTTING TOOL
Filed Jan. 31, 1957 2 Sheets-Sheet 2
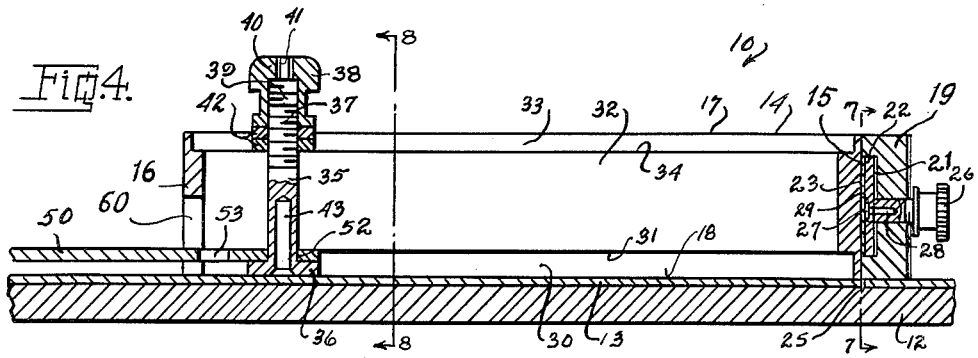
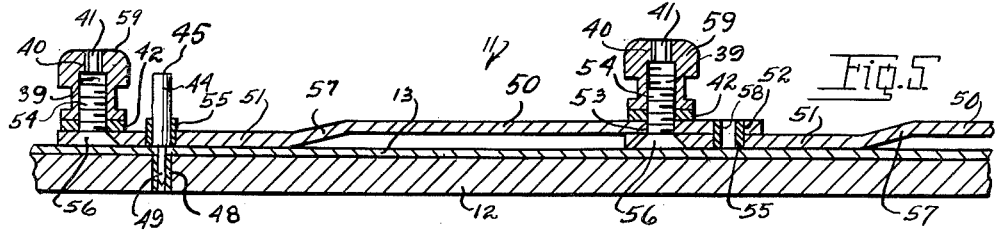
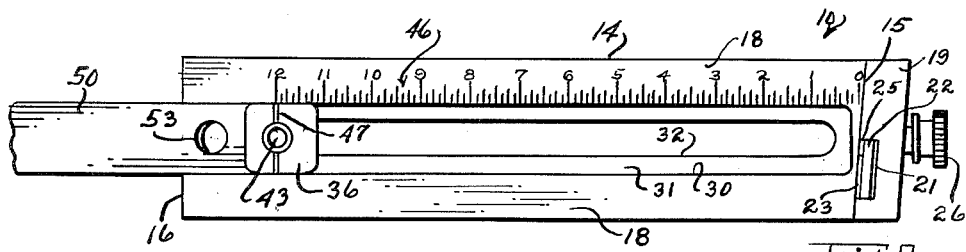
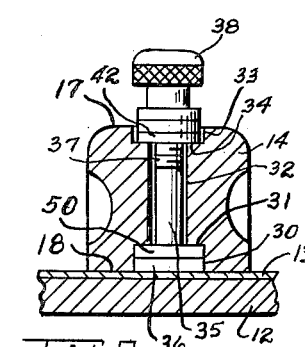
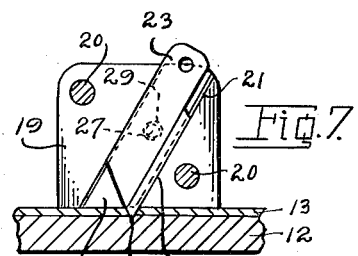
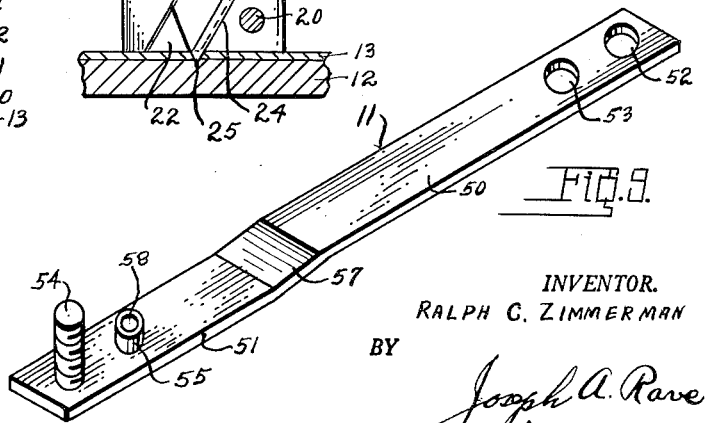
INVENTOR.
RALPH C. ZIMMERMAN
BY Joseph A. Rave
Attorney

United States Patent Office 3,027,640
Patented Apr. 3, 1962

3,027,640
CUTTING TOOL
Ralph C. Zimmerman, Norwood, Ohio, assignor to Zimmerman Packing Company, Norwood, Ohio, a corporation of Ohio
Filed Jan. 31, 1957, Ser. No. 637,576
7 Claims. (Cl. 30—310)

This invention relates to improvements in a cutting tool, particularly such a tool for cutting discs and circles, and particularly to means whereby the capacity of the tool is increased.

A cutting tool of the form herein disclosed is known and in general is not new in the present application, however, the cutting tools of the past were somewhat cumbersome to operate and not as rigid as desired; defects overcome in the tool herein disclosed.

The principal object of the present invention is the provision of an improved cutting tool, per se, whereby the operation of the tool is materially simplified and rendered exceedingly rigid.

Another object of this invention is the provision of a cutting tool of a given capacity together with means whereby said capacity may be increased without sacrificing rigidity in construction and operation.

A still further object of the present invention is the provision of a cutting tool extension bar which may be utilized in multiple whereby the cutting tool can be used for extreme sizes as well as sized intermediate the extremes without being cumbersome and which tool may be adapted for all such sizes in an expeditious manner.

Other objects and advantages of the present invention will be readily apparent by reference to the following specification considered in conjunction with the accompanying drawings forming a part thereof, and it is to be understood that any modifications may be made in the exact structural details there shown and described, within the scope of the appended claims, without departing from or exceeding the spirit of the invention.

In the drawings:

FIG. 1 is a top plan view of the cutting tool of the present invention mounted in operative position.

FIG. 2 is a side elevational view of the mechanism illustrated in FIG. 1.

FIG. 3 is a front elevational view of the cutting tool as seen from line 3—3 adjacent FIG. 1.

FIG. 4 is an enlarged sectional view through the body of the cutting tool as seen from line 4—4 on FIG. 1.

FIG. 5 is an enlarged sectional view through the extension members of the cutting tool as seen from line 5—5 on FIG. 1.

FIG. 6 is a bottom plan view of the cutting tool of FIG. 4 and illustrating a fragment of an extension bar in association therewith.

FIG. 7 is a transverse sectional view through the cutting tool as seen immediately behind the cutting tool clamping head.

FIG. 8 is a transverse sectional view through the cutting tool body as seen from line 8—8 on FIG. 4.

FIG. 9 is a perspective view of one of the extension bars and forming an important detail of the invention.

FIG. 10 is a vertical sectional view of a portion of the cutter body as normally used and without an extension bar.

Throughout the several views of the drawings similar reference characters are employed to denote the same or similar parts.

As disclosed in the drawings the cutting tool of the present invention comprises a cutting tool, per se, 10 and extension bars or members 11. The cutting tool is adapted to be used on a cutting board or table top or some other cutting surface particularly adapted for the cutting of discs and circles, such as gasket material for forming gaskets. There is illustrated in the drawings for this purpose a cutting board 12 on which is disposed the material 13 to be cut.

The cutting tool 10 comprises a body member 14 resembling a block substantially rectangular in plan, as illustrated in FIGS. 1 and 6, with said body member or block including a head end 15, a rear end 16, a top 17 and a bottom 18. The head end 15 is formed with a slight angle in the nature of from three to six degrees so that the cutting blade, presently to be described in detail, can more readily follow a curved path in the formation of discs and circles.

Secured to the head end of the body 14 is a blade or cutting tool clamping head 19 secured in operative position by means of Allen-head screws 20. The said clamping head 19 is provided angularly of its inner face with a groove 21 in which is disposed the blade clamping plate or block 22 and the cutting blade 23. As illustrated in FIG. 7 said groove extends from one corner of the clamping head diagonally toward the vertical center of the clamping block wherefore one edge 24 of said groove passes through the longitudinal center of the clamping head as well as the longitudinal center of the cutter body 14.

The cutter blade 23 is adapted to be longitudinally adjusted in the groove 21 with said adjustment effecting the projection of the cutter blade point 25 to a position to penetrate the material 13 being cut as clearly illustrated in FIGS. 4 and 7. The blade is clamped in operative positions by, as noted above, the blade clamping plate or block 22 which is movable toward the head end 15 of the cutter body 14 for impinging the blade between itself and the face or head end 15. Conversely, retraction of the clamping plate or block 22 releases the blade 23 for adjustment and replacement.

The clamping plate or block 22 is actuated to its clamping position by a thumb screw 26 threaded through the clamping head 19 and having its inner end in engagement with the blade clamping plate or block 22. The said blade clamping plate or block 22 is retained in the slot 21 and is retracted from its clamping position through the head 27 of a pin 28 driven into a socket in the thumb screw 26 with said head 27 disposed in a suitable counterbore 29 in the blade clamping plate or block 22.

The body member 14 is provided upwardly of its bottom 18 with a slot 30 which terminates in a base or shoulder 31 provided by a narrower slot or elongated aperture 32 extending upwardly through the body member 14 and extending for substantially the full length of said body member. The said body member 14 is similarly provided downwardly of its upper surface 17 with a slot 33 terminating in a shoulder 34 again supplied by the body member slot 32.

Disposed within the body slot 32 is a centering post 35 having at its one end a head 36 which is rectangular in plan, preferably square, with, at least, two opposite sides parallel and of a dimension to closely fit within and engage the sides of the slot 30 and having its body portion or post 35 projecting upwardly through the slot or elongated aperture 32 of the body member 14. The upper or projecting end of the post 35 is threaded as at 37 to receive a thumb nut 38. The thumb nut 38 has an internally threaded socket 39 which stops short of the upper end of said nut to provide an inwardly projecting flange 40 through which is formed a passageway 41, angular in plan, which may conveniently take the form and size of an Allen-head socket so that an Allen-head socket wrench may be employed for tightening the said nut. For convenience and ease in subsequent release of the nut use is made of a washer 42 beneath the said nut 38. A similar washer 42 is mounted on the upper surface of the post head 36 as illustrated in FIG. 10.

The post 35 is provided upwardly of its lower end with a socket 43 receiving the enlarged upper end 44 of a centering pin indicated in its entirety by the reference numeral 45.

In practice the post 35 is secured in adjusted operative positions longitudinally of the body member slot 32 by the clamp nut 38 which upon being screwed home engages through its lower surface or a washer 42 therebeneath with the shoulder 34 of the body member top groove 33 for drawing or securing the upper surface of the centering post head 36, either directly against or through the washer 42, with the shoulder 31 of the body member bottom groove 30, all as clearly illustrated in FIG. 10.

In order to accurately position the centering post 35 for forming circles and discs the bottom surface 18 of the body member 14 is provided with suitable graduations 46 which cooperate with an index mark 47 on the lower surface of the centering post head 36.

In use, and as noted above, the material 13 is disposed on the upper surface of a cutting board or other surface 12 and said cutting board is provided with a metallic sleeve 48 at substantially its mid point and the said sleeve receives the reduced pointed end 49 of said centering pin 45 after said reduced and pointed end 49 has been projected through the material at the point about which it is to be cut.

In practice the cutter body portion 14 is made of a convenient length for use and shipping and which length, it has been found, is most desirable in having a range of three inches to six inches which means that the maximum diameter of a circle or disc that may be cut therewith is six inches and twelve inches. There is illustrated in the drawings a tool having a body length with a maximum capacity for a twelve inch diameter circle or disc. It is frequently desirable or necessary that discs and circles of a radius greater than the normal capacity of the cutter body 14, for example six inches, be cut wherefore the extension bars 11 are provided.

It should be noted that the cutter body 14 through its bottom surface 18 has the effect of ironing or smoothing the material ahead of it and of maintaining said material against shifting particularly toward the center pin during the cutting of the material. It is desired that the extension bars maintain, as far as possible, the same condition in the material when they are employed wherefore the extension bars are provided with the particular construction illustrated in the drawings and particularly in FIG. 9.

As illustrated each extension bar 11 is provided with an upper portion 50 and a lower portion 51. The outer end of the upper portion 50 is provided with a pair of spaced apertures, respectively 52 and 53, while the outer end of the lower portion 51 is provided with an upstanding threaded stud 54 and an upstanding apertured sleeve 55. The stud 54, as seen in FIG. 5, is provided with a head 56 through which it is secured in the said extension bar 11 while the sleeve 55 is similarly swedged or forced into a suitable aperture inwardly of the stud 54. The axial spacing of the stud 54 and sleeve 55 is the same as the axial spacing of the apertures 52 and 53 at the other end of the bar 11. The upper portion 50 and the lower portion 51 are respectively disposed in parallel planes and are joined to one another by an inclined portion 57 and the said inclined portion 57 spaces the said portions 50 and 51 in planes equal to the thickness of the material and said extension bar 11 is of a width equal to the width of the body member bottom slot 30 and the centering post head 36. Further, the diameter of the stud 54 and sleeve 55 are substantially equal to the diameter of the centering post 35 while the diameter of the aperture 58 through the sleeve 55 is substantially equal to the diameter of the centering post socket 43 and therefore the enlarged end 44 of the centering pin 45. The diameter of the apertures 52 and 53 are substantially equal to the above referred to diameters of the centering post 35, stud 54 and sleeve 55. As will be readily seen from FIGS. 2, 4 and 5 by holding the lower surface of the extension bar portion 51 flat against the upper surface of the material 13 being cut, the upper surface of the extension bar portion 50 is in the plane of and in contact with the shoulder or base 31 of the body member lower groove 30.

In practice the upper portion 50 of the extension bar 11 is inserted into the body member bottom slot 30 whereupon the centering post is inserted through the outermost aperture 52 and the said centering post secured in the cutter body member 14 as above set forth. The spacing of the axis of the sleeve 55 from the axis of the aperture 52 is equal to the normal capacity of the cutter body member 14 wherefore with the first extension bar 11 secured in position as illustrated in FIG. 4 and disposing the sleeve 55 on the centering pin 45 a disc or circle may be cut having a radius and diameter twice that which the cutter, per se, would produce. It is to be understood that for cutting a disc or circle to a size between the said maximum capacity of the cutter, per se, and double its capacity the centering post 35 is adjusted toward the cutting blade, toward the right as seen in FIG. 4 and 6, which when added to the capacity of the first extension bar will result in the desired radius or diameter in the tool.

In cutting discs or circles just beyond the normal capacity of the cutter, per se, twelve to fourteen inches, for example, which would require the use of the extension bar, the outer end of the extension bar including the sleeve 55 and the upper end 44 of the centering pin 45 may pass beneath the rear end 16 of the cutter body member and to accommodate these parts the said rear end 16 is provided upwardly of the bottom slot 30 with a passageway or cutout 60, as seen in FIGS. 4 and 10. It is understood that said passageway or cutout is of a width to accommodate the width of the said sleeve 55.

When it is desired to extend the capacity of the cutter beyond double capacity of the cutter, per se, additional extension bars 11 are connected to the first extension bars by disposing the apertures 52 and 53 respectively on the sleeve 55 and stud 54 and the said subsequent extension bars secured to one another through a clamp nut 59 which is substantially identical in detail and construction with the centering post clamp nut 38 above described. In use the sleeve 55 of the outermost extension bar is disposed on the centering pin 45 as illustrated in FIG. 5 whereupon the tool is actuated by applying force downwardly and in a clockwise direction as seen in FIG. 1.

As seen in FIGS. 2 and 5, by offsetting the portions 50 and 51 of the extension bars a straight line motion is given to the cutter and said offset portions maintain a smoothing or ironing action on the material between the center pin and cutter, per se, during the said cutting of the disc or circle. At the same time the connections of the extension bars with one another and with the body member 14 are solid and non-yielding.

What is claimed is:

1. In a cutting tool the combination of a body member having a head end, a rear end and a flat bottom from said head end to said rear end, a cutter blade at the head end of the body member, means carried by said head end of the body member for securing the blade in operative position, means including a hollow post carried by said body member adjustable between the head end and the rear end thereof for establishing a center about which the body member and cutter blade may be rotated, an extension bar having a first end removably secured to the body member with the lower surface of said extension bar first end lying in a plane above said flat bottom of the body member and said bar extending rearwardly of said body member, said extension bar having a second end portion and including a portion of the extension bar inwardly of said second end portion with said second end portion in a plane below the plane of the first end portion and with the lower surface of said second end portion in the plane of the body member flat bottom, means carried by said second end portion of the extension bar establishing a center beyond the rear end of the body member about which the body member and its blade may rotate, and means including the aforesaid hollow post removably and adjustably securing said first end of the extension bar to the body member for adjustment toward and from the blade for correspondingly positioning the center establishing means of the extension bar with respect to the cutter blade.

2. In a cutting tool the combination of a body member having a head end, a rear end and a flat bottom from said head end to said rear end, a cutter blade at the head end of the body member, a clamping head having a groove therein for the blade, a blade clamping plate in said groove in face contact with the blade, a clamping screw in end contact with the blade clamping plate for actuating the blade clamping plate into clamping engagement with the blade, means connecting the said blade clamping plate and clamping screw so that retraction of the clamping screw correspondingly retracts the clamping plate, means including a hollow post carried by said body member adjustable between the head end and the rear end thereof for establishing a center about which the body member and cutter blade may be rotated, an extension bar having a first end removably secured to the body member with the lower surface of the said extension bar first end lying in a plane above said flat bottom of the body member and said bar extending rearwardly of said body member, said extension bar having a second portion and including a portion of the extension bar inwardly of said second end portion with said second end portion in a plane below the plane of the first end portion and with the lower surface of said second end portion in the plane of the body member flat bottom, means carried by said second end portion of the extension bar establishing a center beyond the rear end of the body member about which the body member and its blade may rotate, and means including the aforesaid hollow post removably and adjustably securing said first end of the extension bar to the body member for adjustment toward and from the blade for correspondingly positioning the center establishing means of the extension bar with respect to the cutter blade.

3. In a cutting tool including a body member having a head end, a rear end and a flat bottom, a groove upwardly of said body member flat bottom and extending longitudinally thereof from the rear end to the head end of the body member, a first extension bar having a first end portion disposed in said body member groove and rearwardly extending from the body member rear end, a clamp screw having a head within the body member bottom groove beneath the extension bar first end portion with said clamp screw passing upwardly through the said extension bar first end portion and said body member, said body member bottom groove having a depth to accommodate the extension bar first end portion and clamp screw head with said head flush with the body member flat bottom and said extension bar first end portion in a plane above the plane of the body member flat bottom, said extension bar having a second end portion and including a portion of the extension bar inwardly of said second end with said second end portion in a plane below the plane of the first end portion and with the lower surface of said second end portion in the plane of the flat bottom of the body member, a second extension bar having first and second end portions each including an end and extending inwardly from an end with said first end portion in a parallel vertically spaced plane above the plane of the second end portion and with said second end portion having its lower surface in the plane of the plane of the first extension bar second end portion lower surface and with its first end portion disposed and superimposed on the second end portion of the first extension bar, cooperating means on said superimposed end portions of the first and second extension bars for securing same to one another against independent movement, and means in said second end portion of the second extension bar for providing pivot means for the cutting tool body member.

4. In a cutting tool including a body member having a head end, a rear end and a flat bottom, a groove upwardly of said body member flat bottom and extending longitudinally thereof from the rear end to the head end of the body member, a first extension bar having a first end portion disposed in said body member groove and rearwardly extending from the body member rear end, a clamp screw having a head within the body member bottom groove beneath the extension bar first end portion with said clamp screw passing upwardly through the said extension bar first end portion and said body member, said body member bottom groove having a depth to accommodate the extension bar first end portion and clamp screw head with said head flush with the body member flat bottom and said extension bar first end portion in a plane above the plane of the body member flat bottom, said extension bar having a second end portion and including a portion of the extension bar inwardly of said second end with said second end portion in a plane below the plane of the first end portion and with the lower surface of said second end portion in the plane of the flat bottom of the body member, a sleeve carried by and upwardly projecting from the extension bar second end portion, a threaded stud axially spaced from said sleeve and upstanding from said second end portion of the extension bar, a second extension bar having first and second end portions each including an end and extending inwardly from an end with said first end portion in a parallel vertically spaced plane above the plane of the second end portion and with said second end portion having its lower surface in the plane of the plane of the first extension bar second end portion lower surface and with its first end portion disposed and superimposed on the second end portion of the first extension bar, said second extension bar first end portion being provided with apertures respectively receiving the upstanding sleeve and stud of the second end portion of the first extension bar, a nut on said first extension bar threaded stud for securing the superimposed ends on one another, and means carried by said second end portion of the second extension bar for providing a center about which the cutter body member is actuated.

5. In a cutting tool of the class described comprising a body member having a head end, a rear end, and a flat bottom, a cutter blade adapted to be secured against said body member head end, a cutter blade clamping head secured to said body member at its head end and having a groove therein for the cutter blade, a blade clamping plate in said groove in face contact with the blade, a clamping screw rotatably carried by the clamping head and in end contact with the blade clamping plate for actuating the blade clamping plate into clamping engagement with the blade, said blade clamping plate having a counter-bored aperture therethrough and said clamping screw having a socket inwardly projecting from its clamping face in axial alignment with the blade clamping plate counter-bored aperture, and a headed member extending through the blade clamping plate counter-bored aperture into the clamping screw socket with its head in said counter-bore so that retraction of the clamping screw through the head of the headed member correspondingly retracts the clamping plate.

6. As an article of manufacture an extension bar for a cutting tool that includes a body member having a flat lower surface, said extension bar having a first and a second portion respectively including and inwardly extending from an opposite end with said first end portion disposed in a plane parallel with and upwardly of the plane of the second end portion and with said first end portion of the extension bar having an aperture therein and through which a clamp bolt extends for securing the extension bar first end portion to the body member to dispose the lower surface of the extension bar second end portion in the plane of the body flat lower surface, and said extension bar second end portion having secured therein a sleeve adapted for establishing the center of actuation of the body member.

7. As an article of manufacture an extension bar for a cutting tool that includes a body member having a flat lower surface, said extension bar having a first and a second portion respectively including and inwardly extending from an opposite end with said first end portion disposed in a plane parallel with and upwardly of the plane of the second end portion and with said first end portion of the extension bar having formed therein a pair of apertures with their axes spaced from one another and one of which apertures is adapted to have a clamp bolt extended therethrough for securing the extension bar first end portion to the cutter body member to dispose the lower surface of the extension bar second end portion in the plane of the cutter body flat lower surface, and said second end portion of the extension bar having upstanding therefrom a threaded stud and a sleeve whose axes are spaced the same as the axes of the apertures in the extension bar first end portion.

References Cited in the file of this patent

UNITED STATES PATENTS

| | | |
|---|---|---|
| 601,139 | Hamel | Mar. 22, 1898 |
| 1,571,777 | Golden | Feb. 2, 1926 |
| 1,784,911 | Schlitters et al. | Dec. 16, 1930 |
| 2,107,581 | Parsons et al. | Feb. 8, 1938 |
| 2,134,069 | Zimmerman | Oct. 25, 1938 |
| 2,162,568 | Ackron | June 13, 1939 |
| 2,379,752 | Schultz | July 3, 1945 |
| 2,411,629 | Lane | Nov. 26, 1946 |
| 2,413,544 | Carpenter | Dec. 31, 1946 |
| 2,778,423 | Zimmerman | Jan. 22, 1957 |
| 2,819,524 | Matthew | Jan. 14, 1958 |

OTHER REFERENCES

Spearhead Gasket Cutter, Dec. 8, 1952, John R. Robinson (4 page pamphlet), 350 W. 31st St., New York 1, N.Y. (Copy in Div. 11.)